Figure 1:
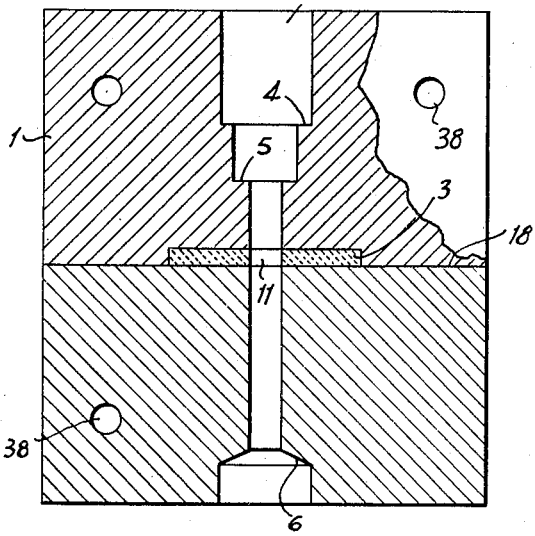

Sept. 8, 1959           W. J. SCOTT           2,903,660

SEALED RECTIFIER UNITS FOR T.R. CELLS

Filed March 7, 1957           2 Sheets-Sheet 1

INVENTOR
WILLIAM JOSEPH SCOTT

HIS ATTORNEY

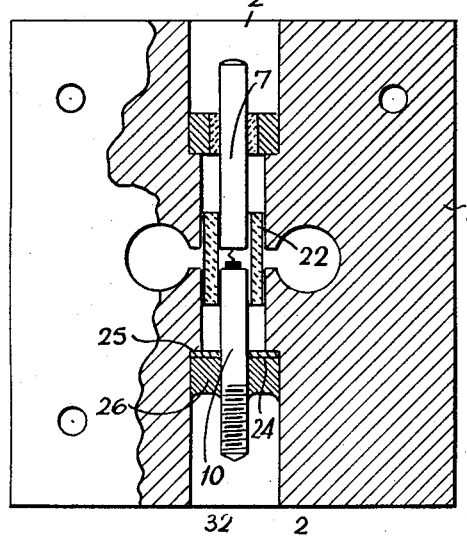
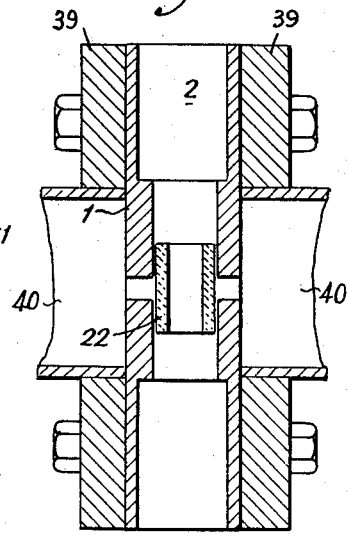
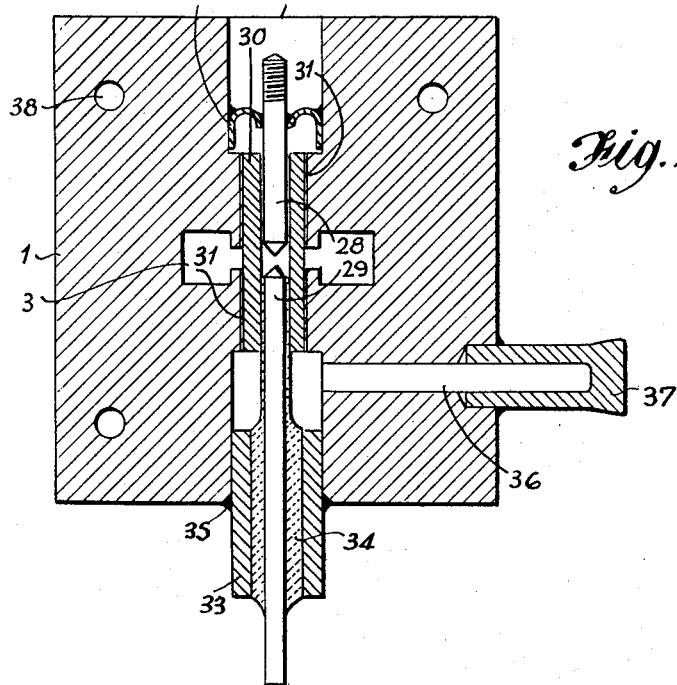

United States Patent Office 2,903,660
Patented Sept. 8, 1959

2,903,660

SEALED RECTIFIER UNITS FOR T.R. CELLS

William Joseph Scott, Rugby, England, assignor to The British Thomson-Houston Company Limited, London, England, a British company Application March 7, 1957, Serial No. 644,534

Claims priority, application Great Britain March 9, 1956

5 Claims. (Cl. 333—98)

This invention relates to the application of sealed crystal detectors, T.R. devices, thermistors or other electrical circuit elements into a wave guide.

It is often required to couple a crystal rectifier or T.R. cell into a wave guide. The hermetic sealing of a T.R. cell is essential since the electrodes between which a discharge is to occur under predetermined conditions must be in an at least partially evacuated envelope. In the case of a rectifier it may also be desirable that it be hermetically sealed and in certain cases that the section of guide into which the rectifying unit is introduced be also hermetically sealed. To hermetically seal a rectifier into the guide may be difficult if the rectifying element is one sensitive to heat and it is necessary to employ heat in the sealing.

The present invention provides an arrangement in which the difficulties above enumerated are overcome and the application of a rectifier, or T.R. cell or other unit to a wave-guide is facilitated.

According to the invention the electrodes of a rectifying unit or T.R. or other device are hermetically sealed into a bore formed within a metal plate or block adapted to constitute a short length of wave-guide, the space containing the device intersecting a transverse slot through the plate and being sealed by at least one hollow insulative body hermetically joined to the wall(s) of the space.

The insulating material may be in the form of glass sealed by fusion to the plate and filling the transverse slot except for a space forming a continuation of the bore. One of the electrodes may be connected to the plate but at least one of them must be insulated therefrom. Alternatively, the insulating material may be in the form of a ceramic tube surrounding the electrodes and joined hermetically to the wall of the bore so that the sealing of the ends of the bore is effective to form an hermetic enclosure for the electrodes. The bore may be of stepped formation to form a radio frequency choke. Generally, the plate will be secured between adjacent ends of sections of wave guide. For this purpose the plate may be provided with spaced holes for receiving bolts which clamp together the plate and flanges on the adjacent ends of the wave-guide sections.

The slot through which the rectifying element extends may constitute a standard wave-guide section. Other forms are dumb-bell or ridged wave-guide shapes forming resonant slots. Oscillations generated in the wave-guide by virtue of waves passing therethrough are rectified by the rectifying element.

In carrying out the invention, the transverse slot may be filled except for the space forming a continuation of the bore which receives the rectifying element by placing glass over one end of the opening and then heating the plate and glass to cause the glass to become plastic and flow into and adhere to the wall of the slot and/or the cross bore. A rod of a material, e.g. graphite, to which glass will not adhere, may be inserted in the bore to prevent the glass from filling the bore and also to provide a space within the slot forming a continuation of the bore, which space is unoccupied by the glass. In an alternative the glass may be allowed to fill the slot and be drilled out where it is not required.

The electrode(s) which form the terminals of the rectifying unit are sealed into the opposite bore(s) on either side of the transverse slot in an insulating manner. Sleeves of insulating material, such as glass or ceramic, may separate the electrodes from the wall of the bore.

Alternatively, a single sleeve of insulating material, e.g. a ceramic material, may be arranged to space the electrodes from the walls of the bore and also to pass through the transverse slot, so as to form an envelope for the rectifying element, the insulating sleeve being sealed to the wall of the bore by a soldering metal. If it is required to evacuate the space occupied by the electrodes of the rectifying element, a transverse bore may be taken through the metal plate and terminate in a seal-off tube, which may be of glass or metal.

Figure 2:
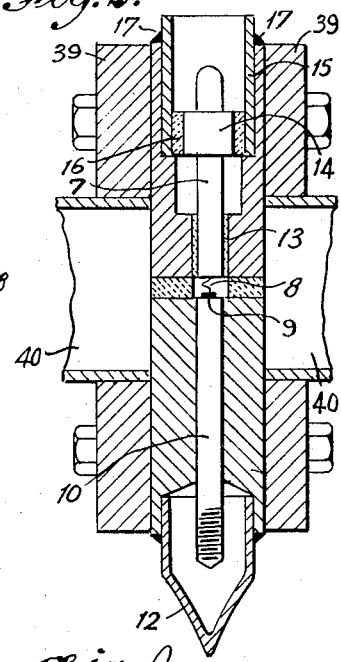
Figure 3:
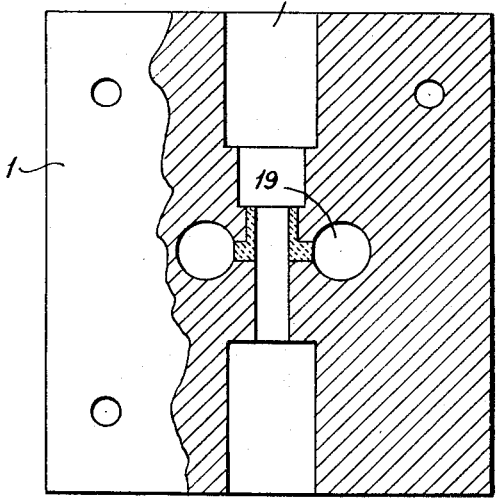
Figure 4:
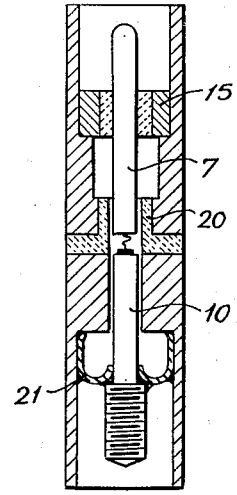

The invention will now be described with the aid of the accompanying drawings, in which Fig. 1 is a view, partly in section, of the metal plate showing the transverse slot and the bore into which the electrodes are to be sealed, Fig. 2 is a cross-section on the line 2, 2 of Fig. 1, showing the rectifier sealed in position in the bore, Fig. 3 is a view similar to Fig. 1 of a modified construction, Fig. 4 is a view similar to Fig. 2 of the arrangement of Fig. 3 with the rectifier in position, Figs. 5 and 6 are views similar to Figs. 1 and 2 of a further modification, and Fig. 7 is a view in cross-section of a modified construction, using a T.R. cell in place of a rectifier.

Referring firstly to the construction shown in Figs. 1 and 2, the plate 1 which is adapted to form a transverse wall of a wave-guide is provided with a bore 2, into which a rectifying unit is to be sealed and a transverse slot 3 intersecting the bore 2. At its upper end the bore 2 is of step formation, being provided with shoulders 4 and 5, and at its lower end with a shoulder 6. Sealed into bore 2 is an electrode 7 forming the termination of the rectifying unit and having attached to it a cats-whisker 8, the cats-whisker being in contact with a rectifying element 9 secured to the electrode 10 which forms the other termination of the rectifying unit. The transverse slot 3 is filled with glass except for a central space 11 forming a continuation of the bore 2, the glass being sealed by fusion to the wall of the slot.

Electrode 10 is in contact with the plate 1 and is preferably a tight fit in the lower portion of the bore 2, the lower end of the bore being sealed by means of a metal evacuating tubulation 12, which is hermetically soldered to the wall of the bore. Electrode 7 carrying the cats-whisker 8 is insulated from the lower narrow portion of the bore 2 adjacent the transverse slot 11 by a sleeve of insulation 13, preferably of glass sealed by fusion to the surfaces of the electrode 7 and made a sliding fit in the plate 1. Near its upper end electrode 7 is provided with an enlargement 14 between which and a surrounding sleeve 15 is provided insulation 16 in the form of a sleeve hermetically sealed between the surface of the enlargement 14 and the sleeve 15. The sleeve 15 is in turn sealed to the wall of the bore 2 by solder at 17.

In manufacturing such a device, the transverse slot 3 is first sealed by fusion of glass by inserting into a furnace the plate together with glass placed over the slot and a graphite rod extending through the narrow portion of the bore 2, whereby the glass is caused to become plastic and flows into and seals to the wall of the slot except for the space left by the inserted graphite rod, In the example illustrated, the plate 1 is formed in two halves with the abutting surfaces 18 in alignment with one wall of the slot 3 in order to provide an easy manufacturing procedure for forming the slot 3. The abutting surfaces and the parts of the plate 1 may be sealed together by copper brazing in hydrogen prior to the filling of the slot 3 with the glass. Plate 1 is preferably made of a nickel-cobalt-iron alloy to which a glass of the borosilicate type is known to seal, the thermal expansion coefficients of the glass and metal being matched to ensure that the glass is substantially free from tension and is preferably in compression when the parts have returned to room temperature after the sealing process. Electrode 10 together with its attached rectifying element 9 is then inserted in the lower portion of the bore 2 so that the rectifying element is adjacent the wall of the slot 3; the electrode 7 is then inserted into the upper end of the bore 2 and is sealed therein at 17 by solder, as previously mentioned. Longitudinal adjustment of the electrode 10 may then be made to provide the final contact pressure at the rectifying surface of the element 9. Thereafter the space may be evacuated and/or filled with a suitable filling gas through the tubulation 12 and sealed-off by squeezing the sides of the tube together. The unit is robust (previous structures used mica windows) and utilises well-proved techniques which give reliable hermetic joints and are simple to apply.

Referring now to the construction shown in Figs. 3 and 4, in this arrangement the transverse slot 3 terminates in circular apertures 19 causing the slot to be of dumb-bell shape. The electrode 7 is sealed into the bore 2 in a somewhat modified manner in that the sleeve 15 soldered to the wall of the bore 2 at its lower end and/or sides instead of projecting from the bore, as shown in the bore illustrated in the construction described in connection with Fig. 1. The solder may be indium, in which case the final joint may be a cold indium weld. Furthermore, the electrode 7 slides into and is separated from the central portion of the bore 2 by glass 20 which is sealed by fusion to the metal plate 1 instead of to the electrode 7, as in the construction described in connection with Figs. 1 and 2. The sleeve of glass 20 may be formed whilst the transverse slot 3 is being filled with glass fusion sealed thereto, in the manner hereinbefore described. A modified arrangement for sealing the electrode 10 is also illustrated, wherein a flexible diaphragm 21 is sealed between the lower portion of the bore 2 of the electrode 10. The soldering operations may be performed in inert gas or other suitable atmosphere, so that a desired gas filling remains in the enclosure.

In the arrangement shown in Figs. 5 and 6 the rectifying unit is insulated from the bore 2 by means of a sleeve 22 of ceramic material which may be soldered by lead-silver alloy using titanium hydride as a flux in the conventional manner. Electrode 7 is insulated from the wall of the bore 2 in a manner similar to that described in connection with the arrangement shown in Figs. 3 and 4. The sealing of the electrode 10 is effected by means of a thin metal plate or diaphragm 24 which is soldered against a shoulder 25 formed on the lower end of the recess, electrode 10 being a stiff push-fit or brazed through an aperture in the diaphragm 24 provided for its reception. Sealing is effected by solder 26 introduced subsequently and which distorts plastically when electrode 10 is adjusted.

Turning now to the construction illustrated in Fig. 7, this illustrates an arrangement in which the rectifying unit utilised in connection with preceding construction is replaced by the co-operating electrodes 28, 29, forming a T.R. device, the gap between the electrodes being located in the transverse slot 3. Electrodes 28, 29 are again insulated from the wall of the bore 2 by means of an insulated sleeve 30, hermetically sealed within the bore by solder at 31. Electrode 28 is sealed in the upper end of the bore 2 by means of the flexible diaphragm 32 in a manner similar to that shown in connection with Fig. 4, whilst electrode 29 is hermetically sealed within a sleeve 33 by glass 34, sealed by fusion between the electrode 29 and the sleeve 33. Sleeve 33 is in turn sealed to the wall of the bore 2 by solder at 35. In order to evacuate the space around the electrodes 28, 29, a transverse passage 36 is formed through the metal plate 1, the end of which is sealed by means of an evacuating tubulation 37. A desired gas and/or vapour filling is provided prior to the sealing-off.

In each construction, bores 38 may be provided in the metal plate to enable the latter to be secured between flanges 39 formed on the ends of adjoining sections 40 of the wave-guide with which the metal plate is to be associated.

What I claim is:

1. In combination, a metal plate adapted for insertion into and transversely across the interior of a waveguide to form a section thereof, said plate having a bore extending through the thickness thereof, the axis of said bore being parallel to the faces of said plate and positioned so as to lie across said waveguide when said plate is inserted therein, said plate being pierced with a slot intersecting said bore, an electrical current conducting device located within said bore, said device having coaxial conductors leading thereto, means hermetically sealing said conductors within said bore on opposite sides of said slot, at least one of said conductors being sealed within said bore by insulating means, and insulating means permeable to high frequency oscillations to be passed through said guide hermetically sealing the slot around said bore so as hermetically to enclose said device.

2. In combination, a metal plate adapted for insertion into and tranversely across the interior of a waveguide to form a section thereof, said plate having a cylindrical bore extending through the thickness thereof, the axis of said bore being parallel to the faces of said plate and being positioned so as to lie symmetrically across said waveguide when said plate is inserted therein, said plate being pierced with a slot shaped to form an electrically resonant aperture through said plate and intersecting said bore, an electrical current conducting device located within said bore, said device having coaxial conductors leading therefrom, insulating means hermetically sealing said conductor within said bore on opposite sides of said slot, and insulating means permeable to high frequency oscillations to be passed through said guide hermetically sealing said slot around said device, one of said conductors being connected to said plate.

3. In combination, a rectangular metal plate adapted for insertion into and transversely across the interior of a waveguide to form a section thereof, said plate having a cylindrical bore extending through the thickness thereof, the axis of said bore being parallel to the faces of said plate and to opposite edges thereof, said plate being pierced with a slot intersecting said bore and shaped to form an electrically resonant aperture through said plate, an electrical contact rectifier located within said bore and disposed within said slot, a pair of conductors connected to said rectifier and extending from within said bore on opposite sides of said slot, means on one side of said slot forming a hermetic seal of one of said conductors to the surface of said bore in electrical connection therewith, means on the other side of said slot forming a seal of the other of said conductors to the surface of said bore and insulated therefrom, and vitreous insulating material hermetically sealing said slot and sealing said rectifier within said bore.

4. In combination, a rectangular metal plate adapted for insertion into and transversely across the interior of a waveguide to form a section thereof, said plate having a cylindrical bore extending through the thickness thereof, the axis of said bore being parallel to the faces of said plate and to opposite edges thereof, said plate being pierced with a slot shaped to form an electrically resonant aperture through said plate which intersects said bore, an electrical contact rectifier comprising a pair of electrodes and located within said bore and disposed within said slot, an insulating sleeve spacing said electrodes from said bore in the vicinity of said slot, means sealing said insulating sleeve to the surfaces of said bore and said slot so as to form an envelope for said rectifier, said insulating sleeve being permeable to high frequency oscillations to be passed through said guide, conductors extending from said pair of rectifier electrodes within said bore and extending therefrom on opposite sides of said slot, means on one side of said slot forming a hermetic seal of one of said conductors to the surface of said bore in electrical connection therewith, and means including insulating material on the other side of said slot forming a hermetic seal of the other of said conductors to the surface of said bore and insulated therefrom.

5. In combination, a rectangular metal plate adapted for insertion into and transversely across the interior of a waveguide to form a section thereof, said plate having a cylindrical bore extending through the thickness thereof, the axis of said bore being parallel to the faces of said plate and to opposite edges thereof, said plate being pierced with a slot intersecting said bore and shaped to form an electrically resonant aperture through said plate, a pair of electrodes forming part of a T.R. device located within said bore and disposed within said slot, said electrodes extending within said bore on opposite sides of said slot, first means hermetically sealing one of said electrodes to the surface of said bore in electrical connection therewith, insulating sealing means spaced along said bore from said first sealing means and hermetically sealing the other of said electrodes to the surface of said bore and insulated therefrom, an insulating sleeve spacing said electrodes from said bore in the vicinity of said slot, means sealing said insulating sleeve to the wall of said bore and across said slot so as to form an envelope for said electrodes, and an evacuating tabulation connected to said envelope and extending through said plate.

References Cited in the file of this patent

UNITED STATES PATENTS

| | | |
|---|---|---|
| 2,413,171 | Clifford et al. | Dec. 24, 1946 |
| 2,505,534 | Fiske | Apr. 25, 1950 |
| 2,781,500 | Armstrong | Feb. 12, 1957 |